United States Patent
Kojima et al.

(10) Patent No.: US 10,469,004 B2
(45) Date of Patent: Nov. 5, 2019

(54) MOTOR DRIVE APPARATUS AND MOTOR DRIVE METHOD

(71) Applicant: Mitsuba Corporation, Gunma (JP)

(72) Inventors: Naoki Kojima, Kiryu (JP); Tomofumi Kobayashi, Kiryu (JP); Atsushi Kawasaki, Kiryu (JP)

(73) Assignee: Mitsuba Corporation, Gunma (JP)

(*) Notice: Subject to any disclaimer, the term of this patent is extended or adjusted under 35 U.S.C. 154(b) by 0 days.

(21) Appl. No.: 15/778,302

(22) PCT Filed: Feb. 3, 2017

(86) PCT No.: PCT/JP2017/003990
§ 371 (c)(1),
(2) Date: May 23, 2018

(87) PCT Pub. No.: WO2017/135411
PCT Pub. Date: Aug. 10, 2017

(65) Prior Publication Data
US 2018/0358911 A1 Dec. 13, 2018

(30) Foreign Application Priority Data

Feb. 4, 2016 (JP) .................... 2016-020157

(51) Int. Cl.
*H02P 6/15* (2016.01)
*H02P 6/20* (2016.01)
*G05B 19/401* (2006.01)

(52) U.S. Cl.
CPC ............ *H02P 6/153* (2016.02); *H02P 6/20* (2013.01); *G05B 19/4015* (2013.01); *H02P 2203/03* (2013.01)

(58) Field of Classification Search
CPC ........ H02P 6/153; H02P 2203/03; H02P 6/20; G05B 19/4015

(Continued)

(56) References Cited

U.S. PATENT DOCUMENTS

2004/0119428 A1* 6/2004 Abe .................. G05B 19/4015
                                                                 318/400.09
2005/0225275 A1* 10/2005 Eskritt ................. B62D 5/065
                                                                 318/437

FOREIGN PATENT DOCUMENTS

JP     2000083397 A     3/2000
JP     2000134978 A     5/2000
(Continued)

OTHER PUBLICATIONS

PCT Office, International Seach Report issued in PCT/JP2017/003990 dated Apr. 18, 2017, 4 pages.
(Continued)

*Primary Examiner* — Eduardo Colon Santana
*Assistant Examiner* — Zemenay T Truneh
(74) *Attorney, Agent, or Firm* — Wood Herron & Evans LLP

(57) ABSTRACT

A motor drive apparatus includes: a stage determination part that determines a position of the rotor based on a combination of states of a plurality of the output signals; and a power distribution timing determination part which determines that a power distribution timing when power is distributed to the coil is a timing obtained by advancing an angle by an amount that corresponds to a predetermined electric angle in a startup time of the motor, wherein, when a rotation speed of the motor becomes a predetermined rotation speed or more, the power distribution timing determination part determines that a timing when a predetermined period of time elapses since a position of the rotor arrives at a position of an electric angle that corresponds to a displacement amount of an electric angle which is arbitrarily advanced with respect to a predetermined electric angle that is advanced in the startup time is a power distribution timing.

5 Claims, 7 Drawing Sheets

(58) Field of Classification Search
USPC .................................. 318/400.14; 310/156.25
See application file for complete search history.

(56) References Cited

FOREIGN PATENT DOCUMENTS

| | | | |
|---|---|---|---|
| JP | 2000270583 | A | 9/2000 |
| JP | 2002238284 | A | 8/2002 |
| JP | 2003224992 | A | 8/2003 |
| JP | 2003348873 | A | 12/2003 |
| JP | 2010200466 | A | 9/2010 |
| JP | 2011199968 | A | 10/2011 |

OTHER PUBLICATIONS

European Patent Office, Search Report issued in corresponding EP 17747562.1 dated Jun. 17, 2019, 7 pages.

* cited by examiner (a)

(b)

MOTOR DRIVE APPARATUS AND MOTOR DRIVE METHOD

TECHNICAL FIELD

The present invention relates to a motor drive apparatus and a motor drive method.

Priority is claimed on Japanese Patent Application No. 2016-020157 filed on Feb. 4, 2016, the contents of which are incorporated herein by reference.

BACKGROUND

In the related art, when driving a brushless motor, a motor drive apparatus sets a mechanical advanced angle to 0 degrees, changes the advanced angle on a software, and drives the brushless motor. Specifically, the motor drive apparatus acquires a sensor signal that corresponds to each of a U-phase, a V-phase, and a W-phase of the brushless motor from a detection sensor (for example, a Hall IC) that detects a rotation position of a motor.

Then, the motor drive apparatus recognizes a stage number on the basis of the acquired sensor signal, reads out a power distribution pattern that corresponds to the stage number, performs shifting by a predetermined rotation position (for example, an electric angle of 30 degrees), and then, by performing a PWM control on a switching element that constitutes an inverter circuit in accordance with the power distribution pattern that is read out, drives the brushless motor.

In a low-speed rotation time of the brushless motor, the interval between sensor signals that are output from the detection sensor is large, and therefore, the motor drive apparatus cannot change the advanced angle and drives the brushless motor at an advanced angle of 0 degrees. However, when driving the brushless motor at an advanced angle of 0 degrees, a counter electromotive voltage due to regeneration is generated. In this case, in a power distribution phase, the motor drive apparatus can allow the counter electromotive voltage to escape toward an electric source side, and therefore, it is possible to prevent a voltage from being increased; however, in a non-power distribution phase, the switching element is in an OFF state, and therefore, a voltage increase is caused. Therefore, the motor drive apparatus may recognize the voltage increase due to the counter electromotive voltage as an abnormal voltage increase occurring and may stop driving the brushless motor for the purpose of protecting an erroneous operation or the failure of circuit components.

In order to allow the counter electromotive voltage that is generated at the non-power distribution phase to escape toward the electric source side, a method of performing a so-called non-free rectangular wave drive is considered in which a power distribution of a predetermined duty ratio is performed to the non-power distribution phase, and a voltage that corresponds to a neutral point is generated. Thereby, by the motor drive apparatus performing the non-free rectangular wave drive, the non-power distribution phase disappears, and it is possible to prevent the voltage from being increased due to the counter electromotive voltage. However, when a current phase becomes later than the advanced angle of 0 degrees by rotating the brushless motor at a high speed, the amount of the counter electromotive voltage is increased. In this case, it is not possible to prevent the voltage from being increased even when performing the non-free rectangular wave drive described above, and there is a possibility that the brushless motor may be stopped.

As a method of reducing this current phase delay, there is a method in which the advanced angle is mechanically shifted, for example, by 30 degrees, and in a reverse rotation time, the stage number (that is, power distribution pattern) is shifted by one on a software. For example, when the advanced angle is mechanically shifted by 30 degrees in a normal rotation direction, a delay angle is shifted by 30 degrees in a reverse rotation direction. A three-phase brushless motor has totally six power distribution patterns, and therefore, by shifting the power distribution pattern by one in a reverse rotation time, an advanced angle of 60 degrees that is an advance of an amount corresponding to one stage number occurs at the delay angle of 30 degrees. As a result, the angle is an advanced angle of 30 degrees even in the reverse rotation time, and it is possible to impart an advanced angle of 30 degrees to both rotations. Therefore, even when the current phase delay occurs, a delay angle does not occur, and it is possible to dissipate the effect by the counter electromotive voltage.

An advanced angle control and a delay angle control of a motor drive apparatus of the related art are described with reference to FIG. 6. FIG. 6 is a view showing a control method of a motor drive apparatus of the related art. Part (a) of FIG. 6 is a view showing a control method of an advanced angle control of the motor drive apparatus of the related art. As shown in part (a) of FIG. 6, the motor drive apparatus of the related art counts time for a certain period of time using a timer on the basis of a previous sensor signal and advances the angle by performing power distribution to a coil of any one of the U-phase, the V-phase, and the W-phase when the time counting is completed. For example, the motor drive apparatus starts a time counting of a certain period of time using the timer at a rising timing of the sensor signal corresponding to the U-phase and performs power distribution to a W-phase coil at a timing when the time counting of the certain period of time is completed. However, an advanced angle of 30 degrees is mechanically added, and therefore, in the advanced angle control of the related art, it is possible to drive the brushless motor only at an advanced angle of 30 degrees or more. Therefore, since it is not possible to perform driving, for example, at an advanced angle of 15 to 20 degrees (power distribution angle of 130 degrees) which is an advanced angle of 30 degrees or less, there is a problem in that it is not possible to adjust the advanced angle, and an operation sound, a radio wave noise, and the like when mounted on an actual vehicle are degraded. In order to solve this problem, there is a method of performing a delay angle control and thereby driving the brushless motor at an optimum advanced angle.

Part (b) of FIG. 6 is a view showing a control method of a delay angle control of the motor drive apparatus of the related art. The motor drive apparatus starts a time counting of a certain period of time by a timer that is provided on a microcomputer at rising and falling timings of each sensor signal and performs power distribution to a coil of each phase at a timing when the time counting of the certain period of time is completed. For example, the motor drive apparatus starts a time counting of a certain period of time by the timer that is provided on the microcomputer at a rising of a U-phase sensor signal and performs power distribution at a negative voltage to a W-phase coil at a timing when the time counting of the certain period of time is completed. The motor drive apparatus starts a time counting of a certain period of time by the timer that is provided on the microcomputer at a falling of the U-phase sensor signal and performs power distribution at a positive voltage to the W-phase coil at a timing when the time counting of the certain period of time is completed.

RELATED ART DOCUMENTS

Patent Documents

[Patent Document 1] Japanese Unexamined Patent Application, First Publication No. 2000-83397

SUMMARY OF INVENTION

Problems to be Solved by the Invention

However, when a timer is counting time, a falling or rising of another sensor signal is input, and therefore, it is necessary to perform a time counting of a certain period of time using a timer that is not counting time in the microcomputer. However, the number of timers in the microcomputer is limited, and therefore, when the number of timers is insufficient, there may be cases in which it is not possible to control driving of the brushless motor. Further, when the number of timers is insufficient, it is necessary to increase the number of timers in the microcomputer, and there is a possibility that, by increasing the number of timers in the microcomputer, costs may be increased.

The present invention provides a motor drive apparatus and a motor drive method capable of driving a motor at an optimum advanced angle without increasing the number of timers.

Means for Solving the Problem

An aspect of the present invention is a motor drive apparatus that supplies a current to a plurality of coils and that rotates a rotor of a motor, the motor drive apparatus including: a plurality of detection sensors that are provided at a phase different from each other in a rotation direction of the rotor and that detect a phase in a rotation direction of the rotor and generate an output signal; a stage determination part that determines a position of the rotor based on a combination of states of a plurality of the output signals; and a power distribution timing determination part which determines that a power distribution timing when power is distributed to the coil is a timing obtained by advancing an angle by an amount that corresponds to a predetermined electric angle in a startup time of the motor, wherein, when a rotation speed of the motor becomes a predetermined rotation speed or more, the power distribution timing determination part determines that a timing when a predetermined period of time elapses since a position of the rotor arrives at a position of an electric angle that corresponds to a displacement amount of an electric angle which is arbitrarily advanced with respect to a predetermined electric angle that is advanced in the startup time is a power distribution timing.

An aspect of the present invention is the motor drive apparatus, wherein the plurality of detection sensors are arranged to be shifted by an amount that corresponds to a predetermined mechanical angle.

An aspect of the present invention is the motor drive apparatus, wherein, when an advanced angle exceeds a threshold value, the power distribution timing determination part determines that a timing when a predetermined period of time elapses since a positon of the rotor arrives at a position of an electric angle at which an amount that corresponds to a predetermined electric angle is switched is a power distribution timing.

An aspect of the present invention is a motor drive method which is a drive method of a motor drive apparatus that supplies a current to a plurality of coils, that rotates a rotor of a motor, and that includes a plurality of detection sensors which are provided at a phase different from each other in a rotation direction of the rotor and which detect a phase in a rotation direction of the rotor and generate an output signal, the motor drive method including: a stage determination step of determining a position of the rotor based on a combination of states of a plurality of the output signals; and a power distribution timing determination step of determining that a power distribution timing when power is distributed to the coil is a timing obtained by advancing an angle by an amount that corresponds to a predetermined electric angle in a startup time of the motor, wherein, when a rotation speed of the motor becomes a predetermined rotation speed or more, the power distribution timing determination step determines that a timing when a predetermined period of time elapses since a position of the rotor arrives at a position of an electric angle that corresponds to a displacement amount of an electric angle which is arbitrarily advanced with respect to a predetermined electric angle that is advanced in the startup time is a power distribution timing.

Advantage of the Invention

As described above, according to an aspect of the present invention, it is possible to provide a motor drive apparatus and a motor drive method capable of driving a motor at an optimum advanced angle without increasing the number of timers.

DESCRIPTION OF THE EMBODIMENTS

Figure 1:
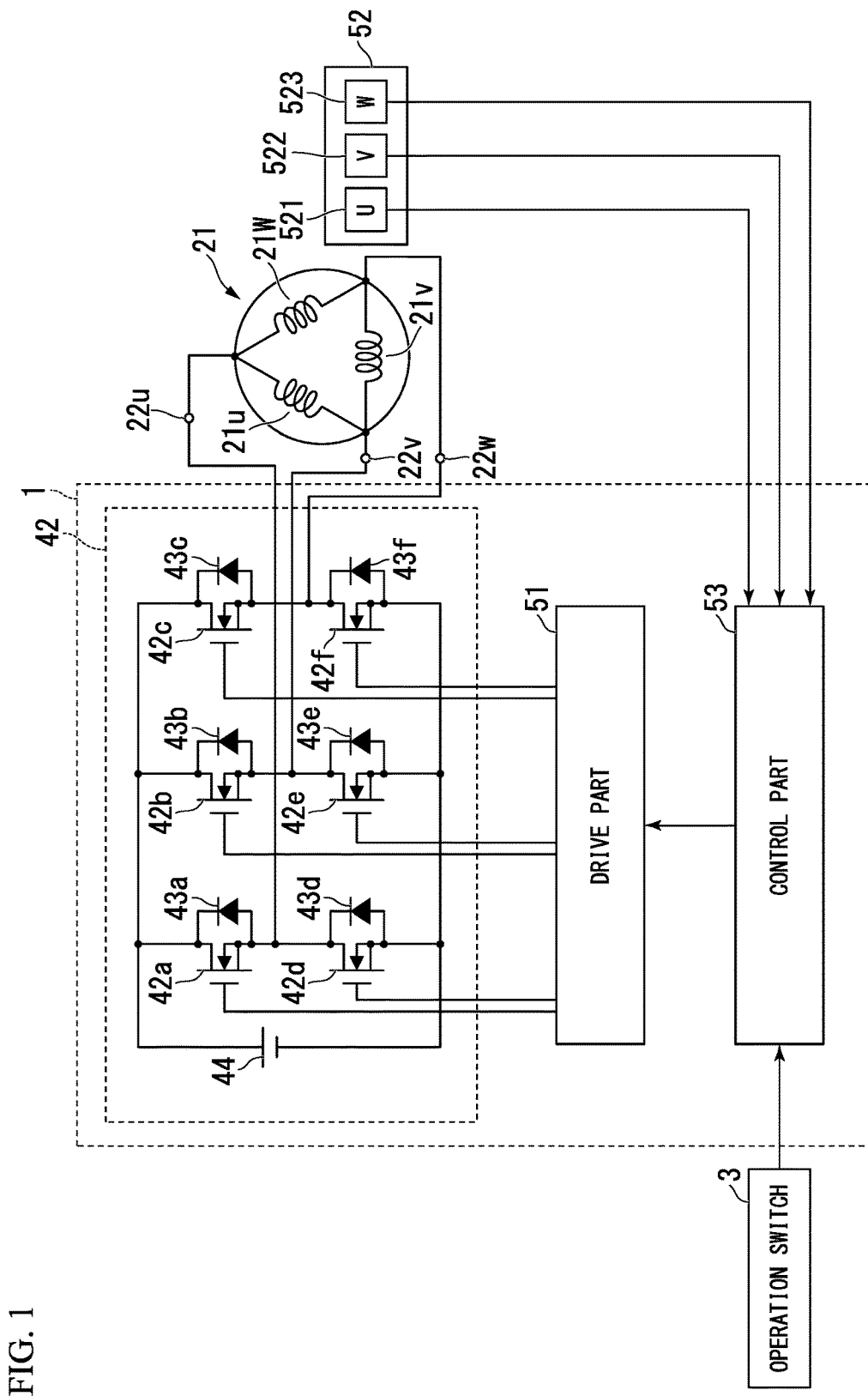
FIG. 1 is a view showing an example of a schematic configuration of a motor drive apparatus in an aspect of the present embodiment.

Hereinafter, an aspect of the present invention is described according to an embodiment of the invention, but the following embodiment does not limit the invention according to claims. Further, all of the combinations of features described in the embodiment are not necessarily indispensable for solving the problem addressed by the invention. In the drawings, the same reference numerals may be given to the same or similar parts, and redundant descriptions may be omitted. The shape, size, and the like of an element in the drawing may be exaggerated for clear description.

A motor drive apparatus in an embodiment supplies a current to a plurality of coils and rotates a rotor. The motor drive apparatus includes: a plurality of detection sensors that are provided at a phase different from each other in a rotation direction of the rotor and that detect a phase in a rotation direction of the rotor and generate an output signal; a stage determination part that determines a position of the rotor on the basis of a combination of states of a plurality of output signals; and a power distribution timing determination part which determines that a power distribution timing when power is distributed to the coil is a timing obtained by advancing an angle by an amount that corresponds to a predetermined electric angle in a startup time of the motor. In the motor drive apparatus, when a rotation speed of the motor becomes a predetermined rotation speed or more, the power distribution timing determination part determines that a timing when a predetermined period of time elapses since a position of the rotor arrives at a position of an electric angle that corresponds to a displacement amount of an electric angle which is arbitrarily advanced with respect to a predetermined electric angle that is advanced in the startup time is a power distribution timing.

Hereinafter, the motor drive apparatus of the embodiment is described with reference to the drawings.

Figure 7:
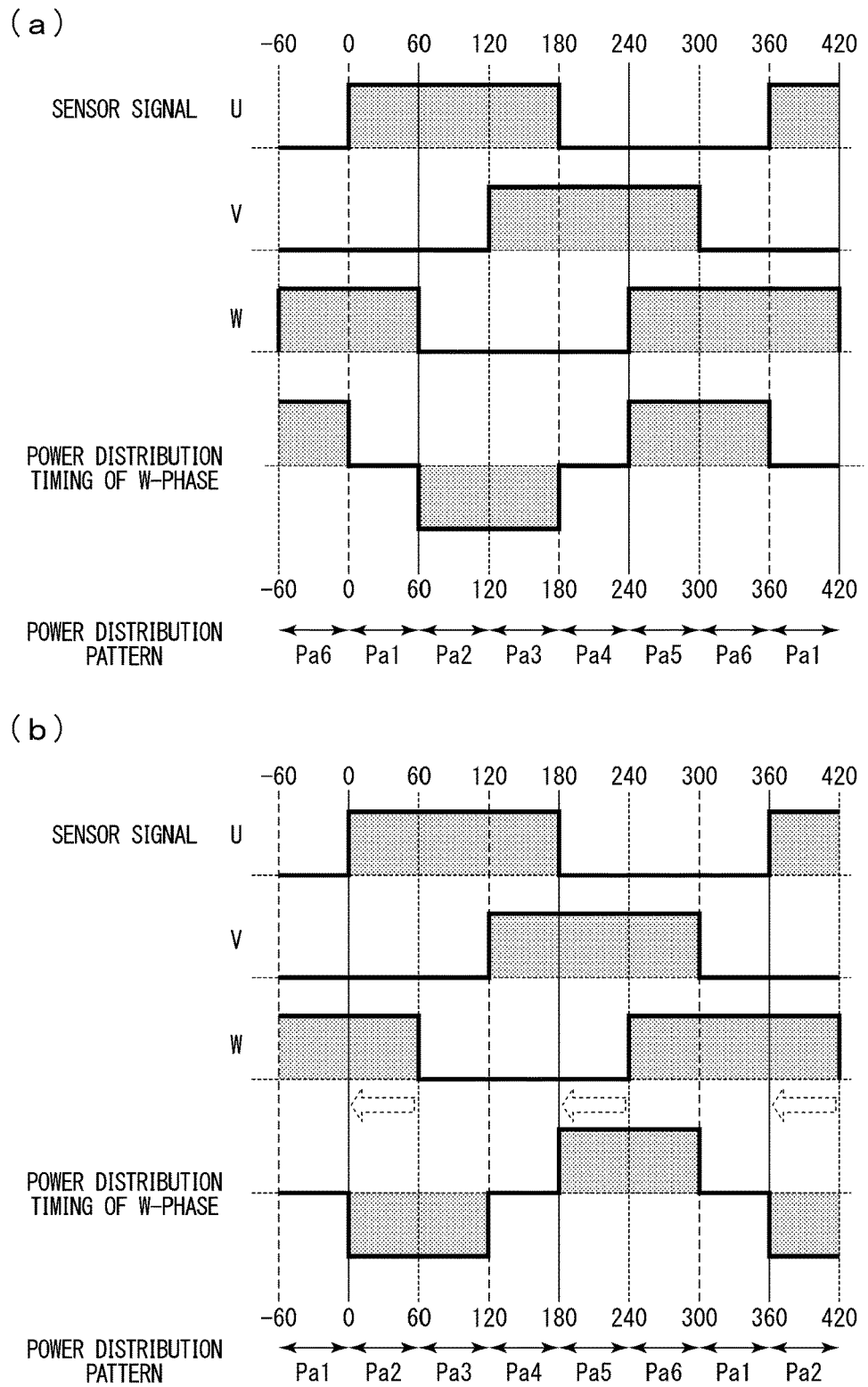
FIG. 7 is a view showing a control method of a motor drive apparatus in accordance with an embodiment of the invention.

FIG. 1 is a view showing an example of a schematic configuration of a motor drive apparatus 1 of the present embodiment, and FIG. 7 is a view showing a control method of the motor drive apparatus 1. The motor drive apparatus 1 is an apparatus that controls driving of an electric motor 21. For example, the electric motor 21 is a drive source that allows a wiper arm of a vehicle to perform a wipe operation. For example, the electric motor 21 is a brushless motor. For example, the electric motor 21 is a motor that is rotatable in both normal and reverse directions such as a three-phase (U-phase, V-phase, and W-phase) brushless motor. The electric motor 21 is driven and rotated on the basis of a drive signal that is supplied from the motor drive apparatus 1. That is, the electric motor 21 is operated when each of an applied voltage Vu, an applied voltage Vv, and an applied voltage Vw is supplied to each of three phases from the motor drive apparatus 1 in accordance with a power distribution pattern. The rotation direction of the electric motor 21 is switched between normal rotation (part (a) of FIG. 7) and reverse rotation (part (b) of FIG. 7) in accordance with the positive and negative of the supplied applied voltage. The present embodiment is described using an example in which the electric motor 21 is a drive source for allowing a wiper arm to perform a wipe operation; however, the embodiment is not limited thereto. The electric motor 21 can be used for generating power of an arbitrary apparatus.

An electric source device 44 and an operation switch 3 are connected to the motor drive apparatus 1. The electric source device 44 is, for example, a secondary battery having a DC voltage of 12V and the like. The operation switch 3 is a switch, which is operated by a user, for driving the electric motor 21. The operation switch 3 is, for example, an operation switch for starting a wipe operation of the wiper arm. The operation switch 3 outputs a drive request of the electric motor 21 that is generated in response to an operation of the operation switch 3 by the user to the motor drive apparatus 1.

As shown in FIG. 1, the motor drive apparatus 1 includes an inverter circuit 42, a drive part 51, a sensor group 52, and a control part 53.

The inverter circuit 42 includes six switching elements 42a to 42f that are connected in a three-phase bridge form and diodes 43a to 43f, each of which is connected between a collector and an emitter of each of the switching elements 42a to 42f in an inverse-parallel connection. The switching elements 42a to 42f are, for example, a FET (Field-Effect Transistor) or an IGBT (Insulated Gate Bipolar Transistor). The drive part 51 is connected to a gate of each of the six switching elements 42a to 42f that are connected in a bridge connection.

The collector or the emitter of the switching elements 42a to 42f is connected to, for example, coils 21u, 21v and 21w that are connected in a delta connection via input terminals 22u, 22v, and 22w of the electric motor 21. Thereby, the six switching elements 42a to 42f perform a switching operation by drive signals (gate signals) G1 to G6 that are input from the drive part 51 and supply an electric source voltage of the electric source device 44 that is applied to the inverter circuit 42 as the applied voltages Vu, Vv, and Vw of three phases (U-phase, V-phase, and W-phase) to the coils 21u, 21v and 21w.

The drive part 51 generates the drive signals G1 to G6 for alternately switching the switching elements 42a to 42f on the basis of a PWM command signal that is supplied from the control part 53 and outputs the drive signals G1 to G6 to the inverter circuit 42. Thereby, the inverter circuit 42 applies power distribution patterns of the supply voltages Vu, Vv, and Vw that are alternately distributed to the coils 21u, 21v, and 21w to each of the coils and rotates the rotor of the electric motor 21 to a rotation direction that is commanded by the control part 53.

The sensor group 52 includes a detection sensor U521, a detection sensor V522, and a detection sensor W523 which are three sensors that detect the position of the rotor of the electric motor 21. When the rotor of the electric motor 21 is rotated, the detection sensors U521 to W523 output the rotation position of the rotor as each of sensor signals (binary signals) that correspond to the U-phase, the V-phase, and the W-phase to the control part 53. In the present embodiment, the detection sensors U521 to W523 are arranged at a position (that is, a position that is shifted by an amount which corresponds to a predetermined electric angle) of which an advanced angle is adjusted for a time of normal rotation. That is, the detection sensors U521 to W523 are arranged at a position that is advanced by an amount which corresponds to a predetermined electric angle. In the present embodiment, the predetermined electric angle is 30 degrees. The electric angle is represented such that an amount of one cycle of a change (that is, a change of a magnetic field) of a magnetic pole position of the electric motor 21 corresponds to 360 degrees. Thereby, in a case where an advanced angle is present, the output of the detection sensors U521 to W523 is changed earlier by an amount that corresponds to an electric angle of 30 degrees compared to a case where an advance angle is absent.

The control part 53 reads out a power distribution pattern as shown in FIG. 7 that corresponds to a stage number which is stored in a first storage unit 69 included in the control part 53 on the basis of the combination (stage number) of the sensor signals of the detection sensors U521 to W523 and outputs a PWM command signal to the drive part 51 in accordance with the power distribution pattern. The stage number represents the position of the rotor of the electric motor 21. A storage part 55 stores power distribution patterns Pa1 to Pa6 that correspond to stage numbers which represent the combination of the sensor signals of the detection sensors U521 to W523. The drive part 51 outputs the drive signals G1 to G6 that separately control the gates of the switching elements 42a to 42f on the basis of the PWM command signal that is input from the control part 53. Since the coils 21u, 21v, and 21w are three-phase coils, the power distribution pattern is formed of an electric angle of one cycle so as to include six types of power distribution patterns Pa1 to Pa6 different from one another each of which corresponds to an amount of an electric angle of 60 degrees. In the present embodiment, stage numbers #1 to #6 and the power distribution patterns Pa1 to Pa6 are mutually associated and stored in the first storage unit 69. Accordingly, the control part 53 selects a stage number in the order of stage numbers #1, #2, #3, #4, #5, #6, #1, #2, #3, #4, #5, #6 . . . at each time when the electric angle is advanced by 60 degrees. Each of the stage numbers and the power distribution patterns described above are recognized by an edge of each sensor signal.

The control part 53 switches the control of the rotation drive of the electric motor 21 between a startup time and an ordinary time of the electric motor 21. The ordinary time is a case in which the electric motor 21 has already been started up, and the rotation is stable.

That is, as shown in part (b) of FIG. 7, in the startup time of the electric motor 21, when the electric motor 21 is reversely rotated, the control part 53 performs a first mode in which, by shifting the stage number by one, an advanced angle of 60 degrees that is an advance of an amount corresponding to one stage number is generated with respect to a delay angle of 30 degrees. In other words, the control part 53 distributes power to the coil at a timing obtained by advancing an angle by an amount that corresponds to a predetermined electric angle (for example, 60 degrees) in the startup time of the electric motor 21.

In the ordinary time of the electric motor 21, when the electric motor 21 is reversely rotated, the control part 53 performs a second mode in which, since a base point of a time counting by a timer is changed from the startup time, by shifting the stage number described above by one in accordance with a displacement amount with respect to an electric angle of which the angle is advanced in the startup time from an arbitrarily determined electric angle, an advanced angle control by the timer is performed from the shifted stage number.

Hereinafter, the first mode in the present embodiment is described.

When the electric motor 21 is rotated normally and reversely, the control part 53 reads out a power distribution pattern that corresponds to a stage number from the first storage unit 69 and outputs the power distribution pattern.

For example, in a case where the advanced angle is 0 degrees, when the detection sensor U521 is at a high level, the detection sensor V522 is at a low level, and the detection sensor W523 is at a high level, the power distribution pattern Pa1 is selected. Then, in the power distribution pattern Pa1, each of voltages of a high voltage-side output and a low voltage-side output is applied to each of both ends of the coil 21u from the inverter circuit 42. In this case, the coil 21v and the coil 21w are connected in a series connection, and therefore, half of a voltage that is applied to the coil 21u is applied to the coil 21v and the coil 21w. On the other hand, a correspondence relationship between the stage number and the power distribution patterns Pa1 to Pa6 at the advanced angle of 30 degrees is the same as the case of no advanced angle. Accordingly, in a normal rotation time, at the advanced angle of 30 degrees, the output signals of the detection sensors U521 to W523 are changed earlier by 30 degrees in the electric angle. That is, the power distribution patterns Pa1 to Pa6 are switched earlier by 30 degrees in the electric angle compared to a case of an advanced angle of 0 degrees. On the other hand, in a reverse rotation time, by advancing the angle by 60 degrees in the electric angle, even in the reverse rotation time, a setting is made such that the power distribution patterns Pb1 to Pb6 are selected earlier by 30 degrees in the electric angle compared to the case of no advanced angle.

In this way, in the present embodiment, by mechanically shifting attachment positions of the detection sensors U521 to W523 with respect to a sensor magnet of the rotor, the advanced angle is electrically shifted by 30 degrees. Accordingly, in a normal rotation time of the electric motor 21, the advanced angle is 30 degrees. When shifting the advanced angle by 30 degrees in the normal rotation direction, a delay angle is shifted by 30 degrees in the reverse rotation direction. Accordingly, the control part 53 generates an advanced angle of 60 degrees that is an advance of an amount corresponding to one stage number for the delay angle of 30 degrees by shifting the stage number by one in the reverse rotation time. As a result, the angle is an advanced angle of 30 degrees even in the reverse rotation time, and the angles of both rotations become an advanced angle of 30 degrees. Thereby, even when the current phase delay occurs, a delay angle does not occur, and it is possible to dissipate the effect by the counter electromotive voltage of the electric motor 21.

Hereinafter, the second mode in the present embodiment is described.

When the rotation speed of the electric motor 21 is a predetermined rotation speed or more, the control part 53 determines that the rotation of the electric motor 21 is stabilized and switches the first mode to the second mode.

When the control part 53 determines that the rotation of the electric motor 21 is stabilized, the control part 53 delays the recognition of the stage number by one in the normal rotation time. That is, the control part 53 places the stage number that is shifted by one in the startup time back to the original stage number. Then, the control part 53 determines a timing of power distribution (hereinafter, referred to as a "power distribution timing") to the coils 21u, 21v, and 21w by using a timer and thereby advances the angle by an amount that corresponds to the predetermined power distribution angle. For example, when a rising or a falling of the sensor signal that is output from the detection sensors U521 to W523 is input, the control part 53 starts a time counting of the timer and performs power distribution to each of the coils 21u, 21v, and 21w at a timing when the time counting of a certain period of time is completed.

Figure 2:
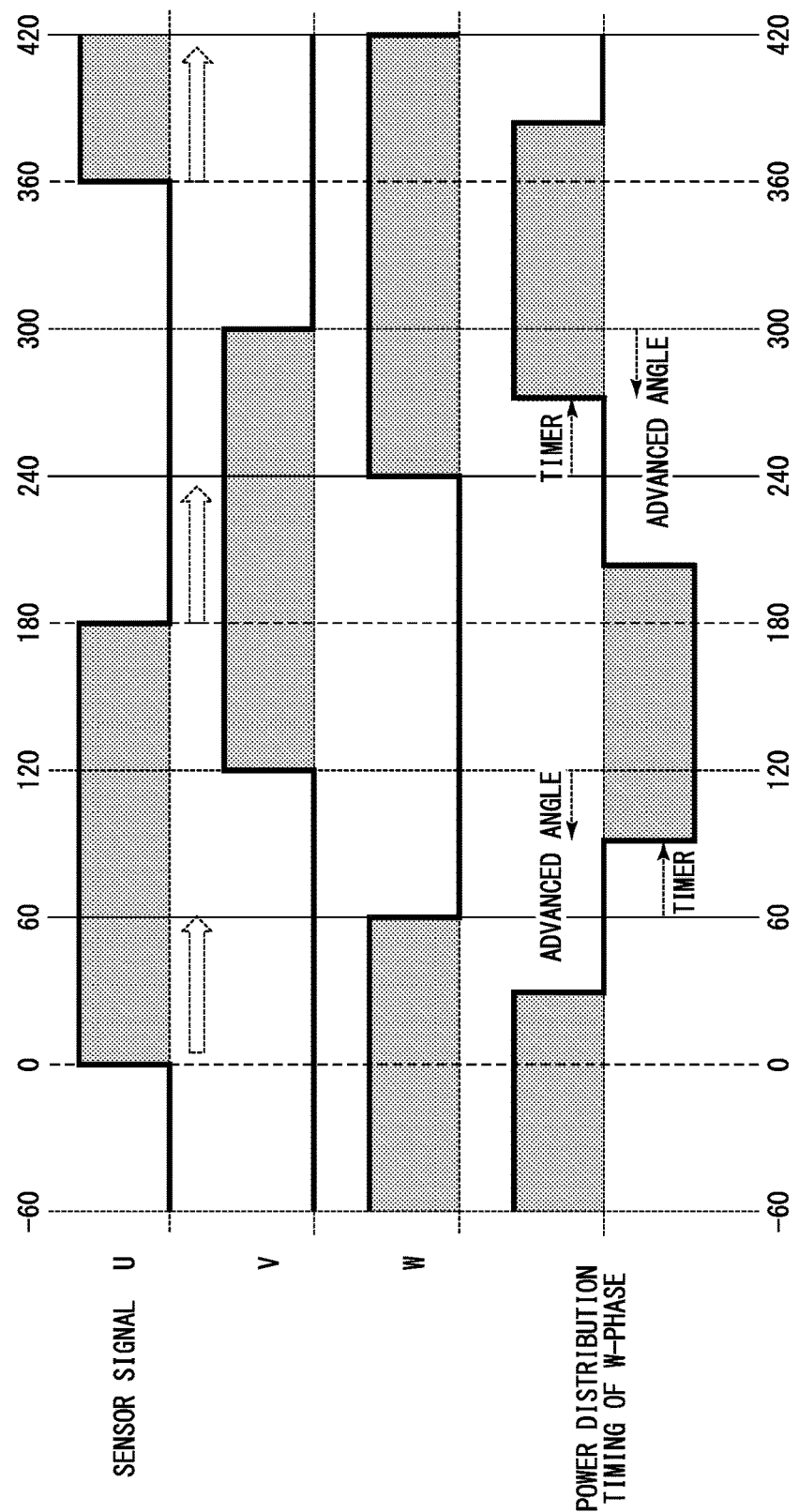
FIG. 2 is a view showing an effect of a second mode in the aspect of the present embodiment.

FIG. 2 is a view showing an effect of the second mode in the present embodiment.

In a case where an advanced angle of 30 degrees is mechanically imparted, the motor drive apparatus of the related art performs a delay angle control and thereby drives the electric motor 21 at an optimum advanced angle. For example, the motor drive apparatus of the related art starts a time counting of a certain period of time by the timer at a rising of the U-phase sensor signal and performs power distribution of a negative voltage to the W-phase coil at a timing when the time counting of the certain period of time is completed. Further, the motor drive apparatus of the related art starts a time counting of a certain period of time by the timer at a falling of the U-phase sensor signal and performs power distribution of a positive voltage to the W-phase coil at a timing when the time counting of the certain period of time is completed. In this way, the motor drive apparatus of the related art starts a time counting of the timer at a rising or a falling of the reference sensor signal of the power distribution phase and thereby performs a delay angle control. However, in the time counting of the timer, a rising or a falling of the sensor signal of another phase is detected, and therefore, it is necessary to perform a time counting of a certain period of time by a timer that is not performing a time counting. Therefore, it is necessary to increase the number of timers.

The motor drive apparatus 1 in the present embodiment delays a sensor signal that becomes a reference of the power distribution phase by one stage (a range of one stage, for example, 60 degrees) and thereby starts a time counting of the timer from the advanced angle of −30 degrees (delay angle of 30 degrees) (in FIG. 2, falling of the W-phase sensor signal). Thereby, a time counting of the timer is available in a range of 60 degrees from −30 degrees to 30 degrees of the advanced angle, and a rising or a falling of the sensor signal of another phase is not detected in a time counting of the timer. Accordingly, the motor drive apparatus 1 can drive the brushless motor at an optimum advanced angle only by an advanced angle control without increasing the number of timers. That is, the motor drive apparatus 1 can obtain an effect similar to the delay angle control by a control of only the advanced angle control without increasing the number of timers. When the advanced angle on the software enters a region the exceeds a threshold value (a range of one stage, for example, 60 degrees), the time counting of the timer does not catch up, that is, a falling or a rising of another sensor signal is input during the time counting of the timer, and therefore, when entering the region that exceeds the threshold value, it is possible to obtain a desired advanced angle by shifting (advancing or delaying) the sensor signal that becomes the reference of the power distribution phase by further one stage (60 degrees).

Hereinafter, a configuration of the control part 53 in the present embodiment is specifically described.

Figure 3:
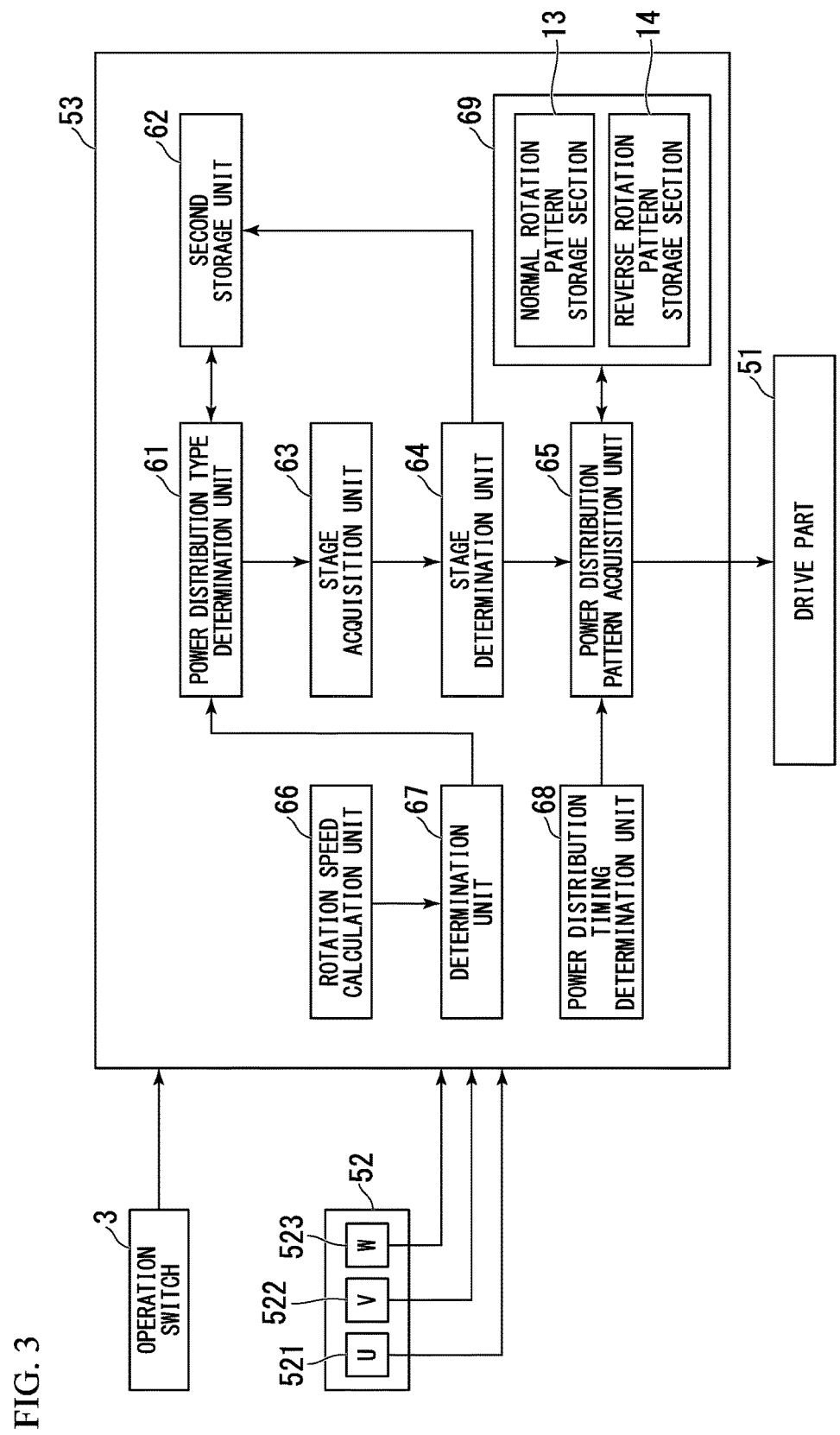
FIG. 3 is a view showing an example of a schematic configuration of a control part 53 in the aspect of the present embodiment.

FIG. 3 is a view showing an example of a schematic configuration of the control part 53 in the present embodiment.

The control part 53 includes a power distribution type determination unit 61, a stage acquisition unit 63, a stage determination unit 64, a power distribution pattern acquisition unit 65, a rotation speed calculation unit 66, a determination unit 67, a power distribution timing determination unit 68, the first storage unit 69, and a second storage unit 62.

The power distribution type determination unit 61 determines the state of the electric motor 21. That is, the power distribution type determination unit 61 determines whether the electric motor 21 is in any of a startup state, an ordinary state, and a stopping state. Then, the power distribution type determination unit 61 stores the determined state of the electric motor 21 in the second storage unit 62. For example, the power distribution type determination unit 61 stores a value indicating the determined state of the electric motor 21 as a variable in the second storage unit 62. For example, when the determined state of the electric motor 21 is in the startup state, the power distribution type determination unit 61 changes the variable of the second storage unit 62 to "1". When the determined state of the electric motor 21 is in the ordinary state, the power distribution type determination unit 61 changes the variable of the second storage unit 62 to "2". When the determined state of the electric motor 21 is the stopping state, the power distribution type determination unit 61 changes the variable of the second storage unit 62 to "3".

For example, when a drive request of the electric motor 21 is not acquired from the operation switch 3, the power distribution type determination unit 61 determines that the electric motor 21 is in the stopping state. When a PWM command signal is not output to the drive part 51, the power distribution type determination unit 61 may determine that the electric motor 21 is in the stopping state. When the drive request of the electric motor 21 is acquired from the operation switch 3, in a case where the rotation speed of the electric motor 21 is a predetermined rotation speed or more, the power distribution type determination unit 61 determines that the electric motor 21 is in the ordinary state. When the drive request of the electric motor 21 is acquired from the operation switch 3, in a case where the rotation speed is less than the predetermined rotation speed, the power distribution type determination unit 61 determines that the electric motor 21 is in the startup state. When the startup of the electric motor 21 that is in the stopping state is started on the basis of the drive request of the electric motor 21 from the operation switch 3, the power distribution type determination unit 61 determines that the electric motor 21 is in the startup state. Thereby, by referring to the value of the variable that is stored in the second storage unit 62, it is possible to confirm the state of the electric motor 21.

The stage acquisition unit 63 acquires a stage number from the combination of sensor signals of the detection sensors U521 to W523. For example, a combination of sensor signals of the detection sensors U521 to W523 and a stage number that corresponds to the combination are stored in advance in a storage unit (not shown), and the stage acquisition unit 63 selects from the storage unit described above and thereby acquires a stage number that corresponds to the combination of the sensor signals that are output from the detection sensors U521 to W523. The stage acquisition unit 63 supplies the acquired stage number to the stage determination unit 64. The stage number represents a position of the rotor.

The stage determination unit 64 refers to the value of the variable that is stored in the second storage unit 62 and thereby recognizes the state of the electric motor 21. When the state of the electric motor 21 is in the startup state, or when the startup of the electric motor 21 is started, the stage determination unit 64 determines a value that is shifted by one with respect to the stage number which is supplied from the stage determination unit 64 as a stage number (hereinafter, referred to as a "control stage number") that is used for driving the electric motor 21. The stage determination unit 64 supplies the determined stage number to the power distribution pattern acquisition unit 65. When the state of the electric motor 21 is in the ordinary state, the stage determination unit 64 supplies the stage number that is supplied from the stage determination unit 64 as the control stage number to the power distribution pattern acquisition unit 65.

The power distribution pattern acquisition unit 65 reads out a power distribution pattern that corresponds to the control stage number which is supplied from the stage determination unit 64 from the first storage unit 69. When a control signal is supplied from the power distribution timing determination unit 68, the power distribution pattern acquisition unit 65 outputs a PWM command signal to the drive part 51 in accordance with the power distribution pattern that is read out.

The rotation speed calculation unit 66 calculates the rotation speed of the electric motor 21 on the basis of the sensor signals of the detection sensors U521 to W523. The rotation speed calculation unit 66 supplies the calculated rotation speed of the electric motor 21 to the determination unit 67.

The determination unit 67 determines whether or not the rotation speed of the electric motor 21 that is supplied from the rotation speed calculation unit 66 is a predetermined rotation speed or more. The determination unit 67 supplies the determination result to the power distribution type determination unit 61.

The power distribution timing determination unit 68 determines a power distribution timing on the basis of the sensor signals of the detection sensors U521 to W523. The power distribution timing determination unit 68 determines that a power distribution timing when power is distributed to the coils 21u, 21v, and 21w is a timing obtained by advancing an angle by an amount that corresponds to a predetermined electric angle in a startup time of the electric motor 21.

Accordingly, when the electric motor 21 is in the startup state, in a case where a rising or a falling of the sensor signals from the detection sensors U521 to W523 is acquired, the power distribution timing determination unit 68 supplies a control signal to the power distribution pattern acquisition unit 65 at a timing obtained by advancing an angle by an amount that corresponds to a predetermined electric angle (startup advanced angle amount, startup time advanced angle amount).

When the electric motor 21 is in the ordinary state, the power distribution timing determination unit 68 performs a shift control on (offsets) a time counting start timing of the timer. The shifting amount (offset amount) is set, for example, on the basis of the power distribution pattern and the startup advanced angle amount.

Specifically, when the electric motor 21 is in the ordinary state, the power distribution timing determination unit 68 switches from the predetermined electric angle of which the angle is advanced in the startup time of the electric motor 21 to a position of an electric angle of which the angle is arbitrarily advanced and determines that a timing when a predetermined period of time elapses since the position of the rotor of the electric motor 21 arrives at the switched position is a power distribution timing. That is, when the electric motor 21 is in the ordinary state, the power distribution timing determination unit 68 determines a timing when a predetermined period of time elapses since a rising or a falling of the sensor signals of the detection sensors U521 to W523 is input as a power distribution timing. The power distribution timing determination unit 68 includes a plurality of timers and starts a time counting of a predetermined period of time by a timer when acquiring a rising or a falling of the sensor signal from the detection sensors U521 to W523. The power distribution timing determination unit 68 determines a timing at which the time counting of the predetermined period of time by the timer is completed as a power distribution timing. Accordingly, when the time counting of the predetermined period of time by the timer is completed, the power distribution timing determination unit 68 supplies a control signal to the power distribution pattern acquisition unit 65. Thereby, when starting the electric motor 21, the control part 53 can control the rotation of the electric motor 21 at an advanced angle of 30 degrees for both rotations. Then, when the electric motor 21 is shifted from the startup state to the ordinary state, the control part 53 places the stage number that is shifted in the startup time of the electric motor 21 back to the original stage number (delays the stage number by one), switches to a stage number that is determined by an arbitrarily determined advanced angle, and performs an advanced angle control by the timer from the switched position.

Hereinafter, a process flow of the control part 53 in the present embodiment is described.

Figure 4:
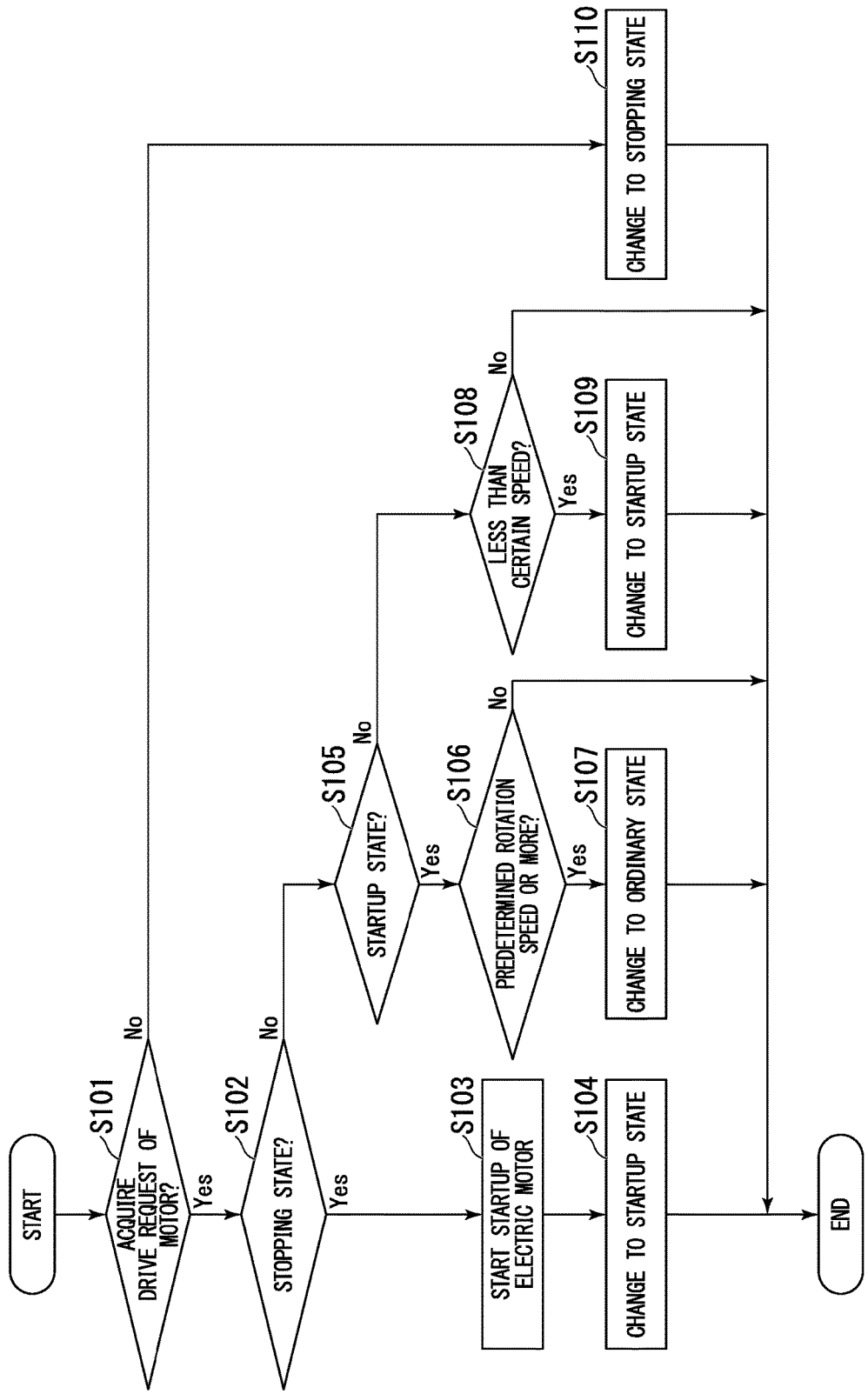
FIG. 4 is a view showing a flow of a determination process of the state of an electric motor 21 in the control part 53 in the aspect of the present embodiment.

First, a flow of a determination process of the state of the electric motor 21 of the control part 53 in the present embodiment is described. FIG. 4 is a view showing a flow of a determination process of the state of the electric motor 21 in the control part 53.

The power distribution type determination unit 61 determines whether or not a drive request of the electric motor 21 is acquired from the operation switch 3 (Step S101). When a drive request of the electric motor 21 is acquired from the operation switch 3, the power distribution type determination unit 61 determines whether or not the electric motor 21 is in a stopping state (Step S102). When it is determined by the power distribution type determination unit 61 that the electric motor 21 is in a stopping state, the startup of the electric motor 21 is started (Step S103). When the startup of the electric motor 21 is started, the power distribution type determination unit 61 changes a variable in the second storage unit 62 to a value which indicates that the electric motor 21 is in the startup state (Step S104). When it is determined that the electric motor 21 is not in a stopping state in Step S102, the power distribution type determination unit 61 determines whether or not the electric motor 21 is in a startup state (Step S105). When it is determined by the power distribution type determination unit 61 that the electric motor 21 is in a startup state, the determination unit 67 determines whether or not the rotation speed of the electric motor 21 that is calculated by the rotation speed calculation unit 66 is a predetermined rotation speed or more (Step S106). When the rotation speed of the electric motor 21 that is calculated by the rotation speed calculation unit 66 is a predetermined rotation speed or more, the determination unit 67 supplies the determination result to the power distribution type determination unit 61. When the determination result which indicates that the rotation speed of the electric motor 21 is a predetermined rotation speed or more is supplied from the determination unit 67, the power distribution type determination unit 61 changes a variable in the second storage unit 62 to a value which indicates that the electric motor 21 is in an ordinary state (Step S107).

When it is determined by the power distribution type determination unit 61 that the electric motor 21 is not in a startup state in Step S105, the determination unit 67 determines whether or not the rotation speed of the electric motor 21 that is calculated by the rotation speed calculation unit 66 is less than the predetermined rotation speed (Step S108). When the rotation speed of the electric motor 21 that is calculated by the rotation speed calculation unit 66 is less than the predetermined rotation speed, the determination unit 67 supplies the determination result to the power distribution type determination unit 61. When the determination result which indicates that the rotation speed of the electric motor 21 is less than the predetermined rotation speed is supplied from the determination unit 67 to the power distribution type determination unit 61, the power distribution type determination unit 61 changes the variable in the second storage unit 62 to a value which indicates that the electric motor 21 is in a startup state (Step S109). When a drive request of the electric motor 21 is acquired from the operation switch 3 in Step S101, the power distribution type determination unit 61 changes the variable in the second storage unit 62 to a value which indicates that the electric motor 21 is in a stopping state (Step S110).

Figure 5:
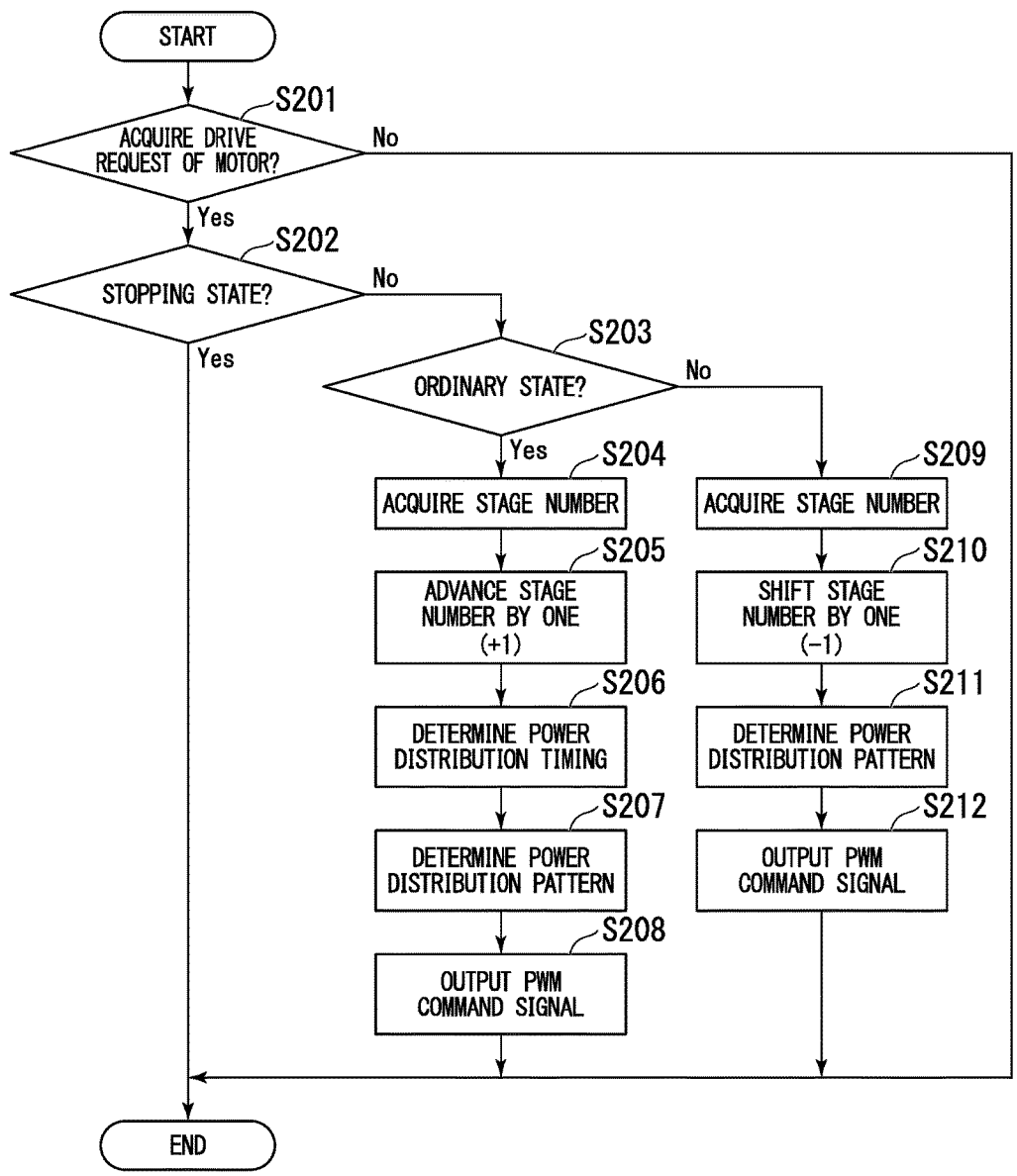
FIG. 5 is a view showing a flow of a process of a drive control of the electric motor 21 of the control part 53 in the aspect of the present embodiment.
Figure 6:
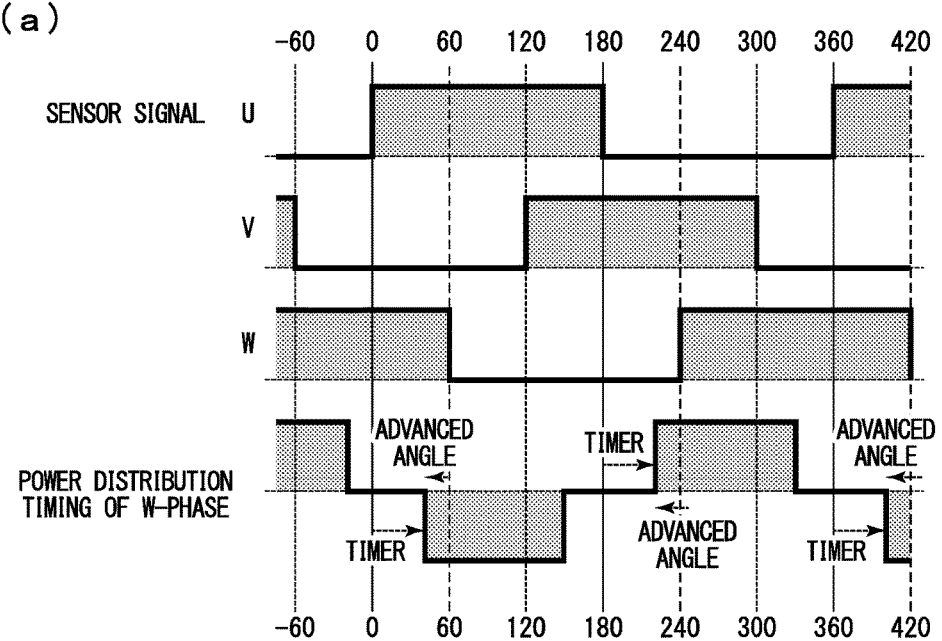
FIG. 6 is a view showing a control method of a motor drive apparatus of the related art.
Figure 6:
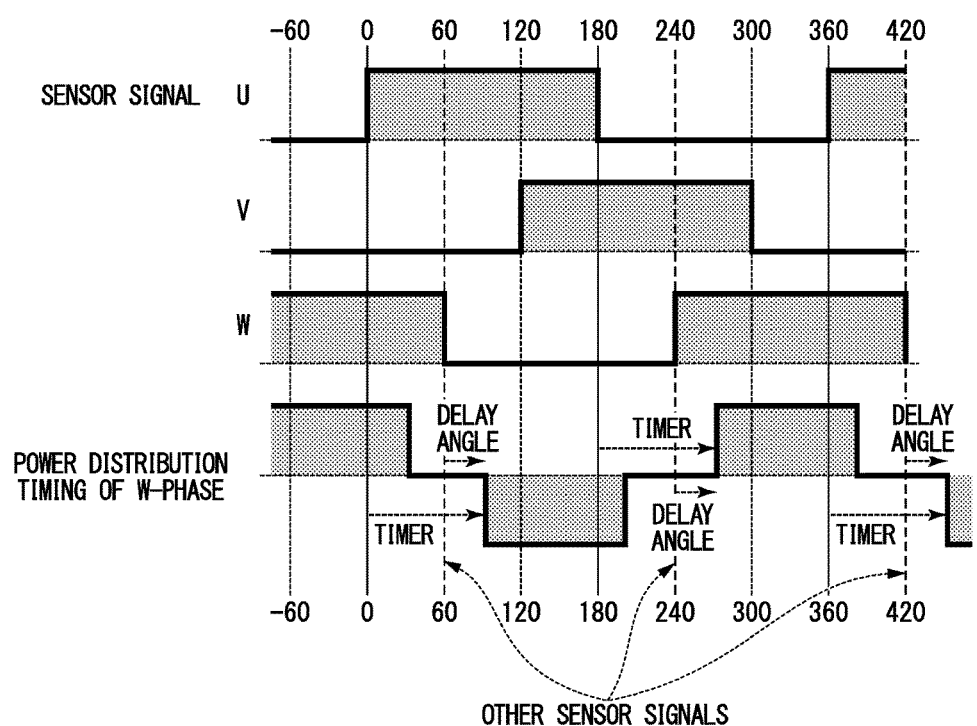

Next, a flow of a process of a drive control of the electric motor 21 of the control part 53 in the present embodiment is described. FIG. 5 is a view showing a flow of a process of a drive control of the electric motor 21 of the control part 53.

The control part 53 determines whether or not a drive request of the electric motor 21 is acquired from the operation switch 3 (Step S201). When a drive request of the electric motor 21 is acquired from the operation switch 3, the control part 53 determines whether or not the electric motor 21 is in a stopping state (Step S202).

When the electric motor 21 is in a stopping state, the control part 53 ends the process of a drive control of the electric motor 21. When the electric motor 21 is not in a stopping state, the control part 53 determines whether or not the electric motor 21 is in an ordinary state. When the electric motor 21 is in an ordinary state in Step S203, the control part 53 performs the second mode. That is, the stage acquisition unit 63 acquires a stage number from the combination of the sensor signals of the detection sensors U521 to W523 (Step S204). The stage acquisition unit 63 supplies the acquired stage number to the stage determination unit 64.

The stage determination unit 64 determines a stage number obtained by delaying, by one, the order of the stage number that is supplied from the stage acquisition unit 63 as a control stage number (Step S205). That is, the control part 53 places the stage number that is shifted by one back to the original stage number in the first mode. The stage determination unit 64 supplies the determined control stage number to the power distribution pattern acquisition unit 65.

The power distribution timing determination unit 68 determines a power distribution timing on the basis of the sensor signals of the detection sensors U521 to W523. When acquiring a rising or a falling of the sensor signals from the detection sensors U521 to W523, the power distribution timing determination unit 68 starts a time counting of a predetermined period of time by the timer. The power distribution timing determination unit 68 determines a timing at which the time counting of the predetermined period of time by the timer is completed as a power distribution timing (Step S206). Accordingly, when the time counting of the predetermined period of time by the timer is completed, the power distribution timing determination unit 68 supplies a control signal to the power distribution pattern acquisition unit 65.

The power distribution pattern acquisition unit 65 reads out a power distribution pattern that corresponds to the control stage number which is supplied from the stage determination unit 64 from the first storage unit 69 (Step S207). When the control signal is supplied from the power distribution timing determination unit 68 to the power distribution pattern acquisition unit 65, the power distribution pattern acquisition unit 65 outputs a PWM command signal to the drive part 51 in accordance with the power distribution pattern that is read out (Step S208). In this way, when the electric motor 21 is shifted from the startup state to the ordinary state, the control part 53 places the stage number that is shifted in the startup time of the electric motor 21 back to the original stage number (delays the stage number by one) and performs an advanced angle control by the timer.

When the electric motor 21 is not in an ordinary state, the control part 53 performs the first mode.

That is, the stage acquisition unit 63 acquires a stage number from the combination of the sensor signals of the detection sensors U521 to W523 (Step S209). The stage acquisition unit 63 supplies the acquired stage number to the stage determination unit 64.

The stage determination unit 64 determines a value that is shifted by one with respect to the stage number which is supplied from the stage acquisition unit 63 as a control stage number (Step S210). The stage determination unit 64 supplies the determined stage number to the power distribution pattern acquisition unit 65.

The power distribution pattern acquisition unit 65 reads out a power distribution pattern that corresponds to the control stage number which is supplied from the stage determination unit 64 from the first storage unit 69 (Step S211). When acquiring a rising or a falling of the sensor signals from the detection sensors U521 to W523, the power distribution pattern acquisition unit 65 outputs a PWM command signal to the drive part 51 in accordance with the power distribution pattern that is read out (Step S212).

In the embodiment described above, the motor drive apparatus 1 supplies a current to a plurality of coils and rotates a rotor of the electric motor 21. The motor drive apparatus 1 includes: a plurality of detection sensors U521 to W523 that are provided at a phase different from one another in a rotation direction of the rotor and that detect a phase in a rotation direction of the rotor and generate an output signal; the stage determination part 64 that determines a position of the rotor of the electric motor 21 on the basis of a combination of states of a plurality of output signals; and the power distribution timing determination part 68 which determines that a power distribution timing when power is distributed to the coils 21u, 21v, and 21w is a timing obtained by advancing an angle by an amount that corresponds to a predetermined electric angle in a startup time of the electric motor 21. Then, when the rotation speed of the electric motor 21 becomes a predetermined rotation speed or more, the power distribution timing determination part 68 switches from the predetermined electric angle of which the angle is advanced in the startup time to a position of an electric angle of which the angle is arbitrarily advanced and determines that a timing when a predetermined period of time elapses since the position of the rotor arrives at the switched position is a power distribution timing. Thereby, a rising or a falling of the sensor signal of another phase is not detected in a time counting of the timer. Accordingly, the motor drive apparatus 1 can obtain an effect similar to the delay angle control by a control of only the advanced angle control without increasing the number of timers. When the advanced angle on the software enters a region that exceeds a threshold value (a range of one stage, for example, 60 degrees), the time counting of the timer does not catch up, that is, a falling or a rising of another sensor signal is input during the time counting of the timer, and therefore, when the advanced angle enters the region that exceeds the threshold value, it is possible to obtain a desired advanced angle by shifting the phase (advancing the angle or delaying the angle) of the sensor signal that becomes the reference of the power distribution phase by an amount that corresponds to the predetermined electric angle. In other words, when the advanced angle exceeds the threshold value, the power distribution timing determination unit 68 determines that a timing obtained by starting a time counting from a position which is shifted (advanced or delayed) by an amount that corresponds to the predetermined electric angle is a power distribution timing.

The control state in the embodiment described above is described. When the detection sensor is arranged to be mechanically shifted, and thereby, the advanced angle is set to 30 degrees as the electric motor 21, in a startup time and in a normal rotation time of the electric motor 21, a correction of 0 degrees is performed as a control (or an angle correction is not performed). Similarly, in a reverse rotation time of the electric motor 21, the advanced angle is −30 degrees, and therefore, a correction of +60 degrees is performed as a control. In an ordinary time, for example, when a target advanced angle is allowed to be 20 degrees, in a normal rotation time of the electric motor 21, a correction of −10 degrees is performed as a control. Similarly, in a reverse rotation time of the electric motor 21, a correction of +50 degrees is performed as a control. When the target advanced angle exceeds a threshold value, a control of shifting the recognized stage number (power distribution pattern) is performed.

A switching control in which a time counting of the timer is not performed in the startup time of the electric motor 21 and the time counting of the timer is performed in the ordinary time is performed. Further, in the ordinary time, on the basis of the obtained advanced angle, in order to switch the recognized sensor edge for starting the time counting of the timer, a control that shifts the stage is performed.

The control part 53 in the embodiment described above may be realized by a computer. In that case, a program for realizing this function may be recorded in a computer-readable recording medium, and the program recorded in the recording medium may be read into and executed on a computer system to thereby realize the function. The "computer system" used herein includes an OS or hardware such as peripherals. The "computer-readable recording medium" refers to portable media such as a flexible disk, a magneto-optical disc, a ROM, and a CD-ROM and a storage device such as a hard disk embedded in the computer system. Further, the "computer-readable recording medium" may include a recording medium that holds a program dynamically for a short period of time like a network such as the Internet or a communication line when a program is transmitted through a communication line such as a telephone line and may include a recording medium that stores a program for a certain period of time like a volatile memory in a computer system which serves as a server or a client in that case. Further, the above program may be a program for realizing some of the functions described above, may be a program capable of realizing the above functions by the combination with a program already recorded in the computer system, or may be a program that is realized by using a programmable logic device such as the FPGA (Field-Programmable Gate Array).

Although the embodiment of the invention has been described in detail with reference to the drawings, a specific configuration is not limited to the embodiment, and designs and the like without departing from the scope of the invention are also included.

The order of executing the processes of operations, procedures, steps, stages, and the like in the apparatus, the system, the program, and the method shown in the claims, the specification, and the drawings is not particularly defined as "before", "prior to", or the like, and the processes can be implemented in an arbitrary order unless the output of the former process is used by the latter process. Even when the operation flow in the claims, the specification, and the drawings is described by using "first", "next", or the like for ease of explanation, the description does not mean that it is indispensable to perform the operations in this order.

DESCRIPTION OF THE REFERENCE SYMBOLS

1 motor drive apparatus
42*a* to 42*f* switching element
42 inverter circuit
51 drive part
52 sensor group
53 control part
61 power distribution type determination unit
62 second storage unit
63 stage acquisition unit
64 stage determination unit
65 power distribution pattern acquisition unit
66 rotation speed calculation unit
67 determination unit
68 power distribution timing determination unit
69 first storage unit

The invention claimed is:

1. A motor drive apparatus that supplies a current to a plurality of coils and that rotates a rotor of a motor, the motor drive apparatus comprising:
   a plurality of detection sensors that are provided at a phase different from each other in a rotation direction of the rotor and that detect a phase in a rotation direction of the rotor and generate an output signal;
   a stage determination part that determines a position of the rotor based on a combination of states of a plurality of the output signals; and
   a power distribution timing determination part that determines a power distribution timing when power is distributed to the coil as a first timing obtained by advancing an angle by an amount that corresponds to a predetermined electric angle in a startup time of the motor,
   wherein, when a rotation speed of the motor becomes a predetermined rotation speed or more, the power distribution timing determination part determines a second timing when a predetermined period of time elapses since a position of the rotor arrives at a position of a second electric angle that corresponds to a displacement amount of a first electric angle which is arbitrarily advanced with respect to the predetermined electric angle that is advanced in the startup time as the power distribution timing.

2. The motor drive apparatus according to claim 1,
   wherein the plurality of detection sensors are arranged to be shifted by an amount that corresponds to a predetermined mechanical angle.

3. The motor drive apparatus according to claim 2,
   wherein, when an advanced angle exceeds a threshold value, the power distribution timing determination part determines a third timing when a predetermined period of time elapses since the position of the rotor arrives at a position of a third electric angle at which an amount that corresponds to the predetermined electric angle is switched as the power distribution timing.

4. The motor drive apparatus according to claim 1,
   wherein, when an advanced angle exceeds a threshold value, the power distribution timing determination part determines a third timing when a predetermined period of time elapses since the position of the rotor arrives at a position of a third electric angle at which an amount that corresponds to the predetermined electric angle is switched as the power distribution timing.

5. A motor drive method that is a drive method of a motor drive apparatus in which a current is supplied to a plurality of coils and a rotor of a motor is rotated and which includes a plurality of detection sensors that are provided at a phase different from each other in a rotation direction of the rotor and that detect a phase in a rotation direction of the rotor and generate an output signal, the motor drive method comprising:

a stage determination step of determining a position of the rotor based on a combination of states of a plurality of the output signals; and a power distribution timing determination step of determining a power distribution timing when power is distributed to the coil as a first timing obtained by advancing an angle by an amount that corresponds to a predetermined electric angle in a startup time of the motor, wherein, when a rotation speed of the motor becomes a predetermined rotation speed or more, the power distribution timing determination step determines a second timing when a predetermined period of time elapses since a position of the rotor arrives at a position of a second electric angle that corresponds to a displacement amount of a first electric angle which is arbitrarily advanced with respect to the predetermined electric angle that is advanced in the startup time as the power distribution timing.

\* \* \* \* \*